United States Patent
Lee

(10) Patent No.: US 6,590,411 B2
(45) Date of Patent: Jul. 8, 2003

(54) IMAGE STICKING MEASUREMENT METHOD FOR LIQUID CRYSTAL DISPLAY DEVICE

(75) Inventor: Man-Hoan Lee, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 100 days.

(21) Appl. No.: 09/977,377

(22) Filed: Oct. 16, 2001

(65) Prior Publication Data

US 2002/0153920 A1 Oct. 24, 2002

(30) Foreign Application Priority Data

Oct. 23, 2000 (KR) ................. 10-2000-6002314

(51) Int. Cl.[7] ............................................... G01R 31/00
(52) U.S. Cl. ..................... 324/770; 349/143; 349/35
(58) Field of Search .................... 324/158.1, 727, 324/770, 519, 522; 349/143, 43, 35, 36, 176, 182, 40; 359/59; 345/52, 88; 428/1.1; 252/299.5, 299.61

(56) References Cited

U.S. PATENT DOCUMENTS 6,366,330 B1 * 4/2002 Khan et al. .................... 349/35
6,529,257 B1 * 3/2003 Nakano ....................... 349/143

* cited by examiner

*Primary Examiner*—Kamand Cuneo
*Assistant Examiner*—Trung Q. Nguyen
(74) *Attorney, Agent, or Firm*—Morgan, Lewis & Bockius LLP

(57) ABSTRACT

A method for measuring an image sticking defect in a liquid crystal display device includes the steps of grounding a liquid crystal cell, the liquid crystal cell includes an alignment layer, applying a first alternating current voltage to the liquid crystal cell, measuring a first capacitance of the liquid crystal cell, applying an electrical stress to the liquid crystal cell, measuring a second capacitance of the liquid crystal cell, and calculating a capacitance difference between the first capacitance and the second capacitance.

23 Claims, 8 Drawing Sheets

IMAGE STICKING MEASUREMENT METHOD FOR LIQUID CRYSTAL DISPLAY DEVICE

This application claims the benefit of Korean Patent Application No. 2000-62314, filed on Oct. 23, 2000 in Korea, which is hereby incorporated by reference.

BACKGROUND OF THE INVENTION

1. Field of the Invention

The present invention relates to a liquid crystal display device, and more particularly, to a method for measuring an image-sticking defect or residual image and for ascertaining whether the image-sticking defect or residual image exists or not.

2. Description of the Related Art

Until now, the cathode-ray tube (CRT) has been generally used for display systems. However, flat panel displays are increasingly beginning to be used because of their small depth dimensions, desirably low weight, and low power consumption requirements. Presently, thin film transistor-liquid crystal displays (TFT-LCDs) are being developed with high resolution and small depth dimensions.

Generally, liquid crystal display (LCD) devices make use of optical anisotropy and polarization properties of liquid crystal molecules to control alignment orientation. The alignment direction of the liquid crystal molecules can be controlled by application of an electric field. Accordingly, when the electric field is applied to liquid crystal molecules, the alignment of the liquid crystal molecules changes. Since refraction of incident light is determined by the alignment of the liquid crystal molecules, display of image data can be controlled by changing the applied electric field.

Of the different types of known LCDs, active matrix LCDs (AM-LCDs), which have thin film transistors and pixel electrodes arranged in a matrix form, are of particular interest because of their high resolution and superiority in displaying moving images. Because of their light weight, thin profile, and low power consumption characteristics, LCD devices have wide application in office automation (OA) equipment and video units. A typical liquid crystal display (LCD) panel may include an upper substrate, a lower substrate and a liquid crystal layer interposed therebetween. The upper substrate, commonly referred to as a color filter substrate, may include a common electrode and color filters. The lower substrate, commonly referred to as an array substrate, may include switching elements, such as thin film transistors (TFTs), and pixel electrodes.

FIG. 1 is a cross-sectional view of a pixel of a conventional LCD panel in an active matrix LCD. As shown, the LCD panel 20 includes upper and lower substrates 5 and 15 and a liquid crystal (LC) layer 10 interposed therebetween. The lower substrate 15 includes a thin film transistor (TFT) "K" as a switching element that transmits a voltage to the pixel electrode 14 to change the orientation of the LC molecules. The pixel electrode 14 disposed on a transparent substrate 1 applies an electric field across the LC layer 10 in response to signals applied to the TFT "K." A first alignment layer 6 may be disposed over the TFT "K" and pixel electrode 14 adjacent to the LC layer 10. Moreover, the lower substrate 15 may include a storage capacitor 16 that maintains the voltage on the pixel electrode 14 for a period of time.

The upper substrate 5 may include a color filter 2 for producing a specific color and a common electrode 4 disposed over the color filter 2. The common electrode 4 serves as an electrode for producing the electric field across the LC layer (in combination with the pixel electrode 14). The common electrode 4 may be arranged over a pixel portion "P," i.e., a display area. The second alignment layer 7 may be disposed on the common electrode 4. Further, to prevent light leakage of the LC layer 10, a pair of substrates 5 and 15 may be sealed by a sealant 12.

Although FIG. 1 only shows one TFT "K," the lower substrate 15 usually includes a plurality of TFTs as well as a plurality of pixel electrodes each of which electrically contact each of the plurality of TFTs. In the above-described LCD panel 20, the lower substrate 15 and the upper substrate 5 are respectively formed through different manufacturing processes, and then attached to each other. As previously described, the liquid crystal display devices make use of the optical anisotropy and polarization properties of the liquid crystal molecules. Since the liquid crystal molecules are thin and long, and the electric field is applied to the liquid crystal layer, the alignment direction of the liquid crystal molecules can be changed and controlled by the applied electric field. Accordingly, incident light is modulated to display images.

FIG. 2 is a circuit diagram of a conventional active matrix liquid crystal display panel.

In FIG. 2, the active matrix liquid crystal display panel comprises a number of horizontal gate bus lines 32, and a number of vertical data bus lines 42 intersecting the gate bus lines 32, thereby forming a matrix of orthogonal bus lines 32 and 42. One pixel is formed at each intersection of gate and data bus lines 32 and 42. Moreover, a thin film transistor "K" is formed at each intersection of the gate and data bus lines 32 and 42 that includes a source electrode "S" connected to a corresponding data bus line 42, a gate electrode "G" connected to a corresponding gate bus line 32, and a drain electrode "D" connected to a storage capacitor "$C_{st}$," and a corresponding individual or pixel electrode of liquid crystal cell "$C_{lc}$." A pixel voltage "$V_p$" is applied to the pixel electrode of the liquid crystal cell "$C_{lc}$" from the data lines 42 through the TFT "K." A common voltage "$V_{com}$" is applied to a common electrode that is connected to both the liquid crystal cell "$C_{lc}$" and the storage capacitor "$C_{st}$." In the conventional liquid crystal display panel, the liquid crystal cell "$C_{lc}$" and the storage capacitor "$C_{st}$" are connected in parallel. A scanning line driving circuit 30 successively supplies a gate pulse voltage to the gate bus lines 32 with a horizontal scanning period. On the other hand, a signal line driving circuit 40 supplies a pixel signal voltage to the data bus lines 42 in each horizontal scanning period.

The array substrate of the active matrix liquid crystal display panel integrally comprises (m×n)-number of pixel electrodes 14 (of FIG. 1) arranged in a matrix, an m-number of gate bus lines $G_1$ to $G_m$ arranged along the rows of the pixel electrodes, an n-number of data bus lines $D_1$ to $D_n$ arranged along the columns of the pixel electrodes. Furthermore, an (m×n)-number of thin film transistors "K" are arranged as switching elements in the vicinity of cross points between the gate bus lines $G_1$ to $G_m$ and the data bus lines $D_1$ to $D_n$ corresponding to the (m×n)-number of the pixel electrodes. The scanning line driving circuit 30 drives these gate bus lines $G_1$ to $G_m$, and a signal line driving circuit 40 drives the data bus lines $D_1$ to $D_n$.

Therefore, the scanning line driving circuit 30 successively supplies the gate bus lines 32 with a signal that drives all the gate bus lines $G_1, G_2, \ldots G_m$ to turn on all the TFTs "K" arranged in the direction of the column selected by these gate bus lines. The signal line driving circuit 40 also supplies to the data bus lines 42 a signal that drives all the data bus lines $D_1$, $D_2$, ... $D_n$ to apply a predetermined potential through the data bus lines to all the TFTs "K" that have been turned on. When the gate pulse voltage is applied to the gate bus line $G_1$, all the TFTs "K" connected to the gate bus line $G_1$ are turned on. At this time, the turned-on TFTs "K" electrically connect the data bus lines to the liquid crystal cell "$C_{lc}$" and storage capacitor "$C_{st}$" that are electrically connected to the gate bus line $G_1$. As a result, the pixel signal voltage supplied from the signal line driving circuit 40 is applied to the determined liquid crystal cell "$C_{lc}$" and storage capacitor "$C_{st}$." Specifically, the liquid crystal molecules are aligned and oriented by the pixel signal voltage applied to the liquid crystal cell "$C_{lc}$" thereby displaying images using the anisotropic characteristics of the liquid crystal molecules.

Thereafter, the gate pulse voltage is applied to the gate bus line $G_2$, thereby turning on the TFTs connected to the gate bus line $G_2$. At this time, the TFTs connected to the gate bus line $G_1$, are turned off. However, the accumulated electricity in the liquid crystal cell "$C_{lc}$" and storage capacitor "$C_{st}$" electrically connected to the gate bus line $G_1$ makes the TFTs connected to this gate bus line $G_1$ continue in on-state until the gate pulse voltage is applied to the gate bus line $G_1$ at the next time.

Some problems occur when operating a thin film transistor liquid crystal display using the above-described method. For example, an image-sticking defect may occur when a residual image is displayed as a result of continuously displaying the same image for a long periods of time. The image-sticking defect is commonly caused by a residual direct current (R-DC) voltage generated in the liquid crystal cell "$C_{lc}$" as explained in FIGS. 3, 4A and 4B. Furthermore, another cause of the image-sticking defect is reciprocal action of pairs of alignment layers due to electrical stress weakness of the alignment layer.

FIG. 3 is a partial circuit diagram of a conventional pixel of liquid crystal display panel, FIG. 4A is a voltage plot showing the voltages applied to the thin film transistor of the liquid crystal panel, and FIG. 4B is a voltage plot showing the voltage applied to the liquid crystal cell via the thin film transistor. Alignment of liquid crystal molecules deteriorates as a result of application of a direct current voltage. Furthermore, dielectric anisotropy affects the dielectric constant of the liquid crystal cell in accordance with the alignment of the liquid crystal molecules. Accordingly, an alternating current voltage is widely used when driving the thin film transistor.

In FIG. 4A, when employing the above-described method for operating a TFT-LCD, a signal voltage Vd applied to the source electrode "S" begins to accumulate in the liquid crystal cell and storage capacitor at the time when the gate pulse voltage Vg is applied to the thin film transistor. Although this accumulated signal voltage Vd should be maintained until a next signal voltage is applied, the accumulated signal voltage Vd is discharged by the parasitic capacitor "$C_{gs}$" (shown in FIG. 3) that is formed between the gate electrode "G" and the source electrode "S" of the thin film transistor. The discharged voltage ΔV, shown in FIG. 4B, causes an "off-set" direct current voltage to be applied to the liquid crystal cell "$C_{lc}$." Accordingly, the storage capacitor "$C_{st}$" is parallel-connected to the liquid crystal cell "$C_{lc}$" to suppress the "off-set" direct current voltage. However, the storage capacitor "$C_{st}$" cannot completely control the "off-set" direct current voltage, and a portion of the "off-set" direct current voltage is applied to the liquid crystal cell "$C_{lc}$."

In FIG. 3, when the direct current voltage is applied to the liquid crystal cell "$C_{lc}$", impurities 52 and 53 are ionized. Positively ionized impurities 52 are adjacent to a negatively polarized alignment layer 51 and negatively ionized impurities 53 are adjacent to a positively polarized alignment layer 54. Over time, the ionized impurities 52 and 53 adhere to the alignment layers. Therefore, the liquid crystal molecules 55 retain their own direct current voltage, i.e., R-DC voltage, due to the ionized impurities 52 and 53 adhering to the alignment layers 51 and 54, respectively. Accordingly, the R-DC voltage in the liquid crystal cell is a major factor causing the image-sticking defect along with the electrical characteristics of the alignment layer. Since the R-DC voltage changes a pretilt angle and alignment of the liquid crystal molecules in the liquid crystal cell, the liquid crystal molecules are not susceptible to the applied signal. Therefore, the image sticking defect occurs when displaying another image after continuously displaying the same image for a long period of time.

The alignment layer is formed of a high molecular compound, such as polyimide, and is disposed adjacent to the liquid crystal layer. The alignment layer is formed by a rubbing process to orient the liquid crystal molecules in one direction. The alignment of the liquid crystal molecules is variable in accordance with the alignment layer. Furthermore, the response of the liquid crystal molecules to the applied electric field is variable in accordance with the alignment layer. Since the alignment layer is electrically susceptible to rubbing conditions, the alignment layer can trap electrical charges. Accordingly, any trapped electrical charges may decrease control of the alignment of the liquid crystal molecules, thereby contributing to the image-sticking defect.

Two causes for the formation of the image-sticking defect, the R-DC voltage, and the electrical characteristics of the alignment layer, may not be readily recognizable. Namely, the two above-described causes for creating the image-sticking defect are related to each other. Furthermore, other factors may cause the image-sticking defect in the TFT-LCD since the LCD device includes many other elements and the LCD device may be fabricated by different processes.

One method for measuring the image-sticking defect includes observation by the naked eye. However, the naked eye observation has an observational error of ±2%, and thus it is very difficult to confirm whether or not the image-sticking defect exists. Additionally, observation by the naked eye cannot accurately provide a degree with which the image-sticking defect occurs. Alternatively, there are other methods for measuring the image-sticking defect that use characteristics of the LCD elements. Specifically, the image-sticking defect existence and degree are measured by way of observing the elements of the liquid crystal display that may affect the image-sticking defect. However, among the different methods for measuring the image-sticking defect, the method of measuring R-DC voltage is widely known. The image-sticking defect caused by the electrical characteristics of the alignment layer cannot be effectively measured. Additionally, the method of measuring the variable factors causing the image-sticking defect is not sufficiently developed.

Currently, a method for measuring the R-DC voltage and a voltage holding ratio (VHR) measurement method are known. When a liquid crystal display panel exhibits a R-DC voltage, both the image-sticking defect and flickering occur in the liquid crystal display panel. In order to control and prevent the flickering phenomenon, a voltage opposite in polarity to the "off-set" voltage is applied to the liquid crystal cell. In the R-DC voltage measurement method, the "off-set" voltage that is applied to the liquid crystal cell by the thin film transistor is measured. According to the voltage holding ratio (VHR) measurement method, a discharged direct current voltage is measured. A voltage stored in the liquid crystal cell is discharged by the resistance of the liquid crystal layer when the TFT is turned on, thereby causing the R-DC voltage. Then, the alternating current voltage applied to the liquid crystal cell and the charged voltage remaining at the liquid crystal cell are measured. From the result of these measurements and the voltage holding ratio, the discharged direct current voltage is theoretically calculated.

In FIGS. 5 and 6, the R-DC voltage measurement method and the VHR measurement method are compared to each other. FIG. 5 is a graph showing relative maximum values of a R-DC voltage according to the R-DC voltage measurement method, and FIG. 6 is a graph showing relative maximum values of a R-DC voltage according to the VHR measurement method. In these graphs, roman numeral I represents a polyimide alignment layer, and roman numeral II to VI represent alignment layers respectively fabricated by different fabrication processes. In order to measure the R-DC voltage, the direct current voltage is successively applied to the liquid crystal cells having the different kinds of alignment layers in a direction from negative to positive (L.R-DC), and then applied in a direction from positive to negative (T.R-DC).

The R-DC voltage and VHR measurement methods are widely used in measuring the image-sticking defect. However, these measurement methods do not consider any intrinsic characteristics of LCD elements. Therefore, although the liquid crystal cells have the same alignment layer when performing the above-described measurement methods, the results are different depending on each of the measurement cases.

Accordingly, the above-described methods using the R-DC voltage is not an adequate measurement method when testing for the existence and degree of the image-sticking defect. Specifically, the existence of the image-sticking defect cannot be clearly known, and the image-sticking defect degree can-not be accurately measured.

SUMMARY OF THE INVENTION

Accordingly, the present invention is directed to a method for measuring an image-sticking defect in a liquid crystal display panel that substantially obviates one or more of problems due to limitations and disadvantages of the related art.

An object of the present invention is to provide a method for measuring an image-sticking defect in a liquid crystal display device.

Another object of the present invention is to provide a method that can measure and quantify an image-sticking in a liquid crystal display device.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for measuring an image sticking defect in a liquid crystal display device includes the steps of grounding a liquid crystal cell, the liquid crystal cell including an alignment layer, applying a first alternating current voltage to the liquid crystal cell, measuring a first capacitance of the liquid crystal cell, applying an electrical stress to the liquid crystal cell, measuring a second capacitance of the liquid crystal cell, and calculating a capacitance difference between the first capacitance and the second capacitance.

Another object of the present invention is to provide a method for measuring an image sticking defect in a liquid crystal display device including the steps of applying a first alternating current voltage to a liquid crystal cell, measuring a first capacitance of the liquid crystal cell, electrically connecting a thin film transistor to the liquid crystal cell, applying a second alternating current voltage to the thin film transistor, the second alternating current voltage is selected from a group comprising alternating current voltages each having different waveforms and alternating current voltages each having different voltage values, combining the second alternating current voltage with an off-set voltage occurring in the thin film transistor to obtain a combined voltage, applying the combined voltage to the liquid crystal cell, measuring a second capacitance of the liquid crystal cell, calculating a capacitance difference between the first capacitance and the second capacitance, and calculating a quantified value of the image sticking defect by the following equation:

$$y = Avr(\Delta C/C_1) - \alpha(\Delta C/C_1)$$

wherein "y" is the quantified value of the image sticking defect, $C_1$ is the first capacitance, $\Delta C$ is the capacitance difference between the fist capacitance and the second capacitance, "$Avr(\Delta C/C_1)$" is an average of capacitance differences when the second alternating current voltage is applied to the thin film transistor, and "$\alpha$" is a value of the second alternating current voltage applied to the liquid crystal cell.

Another object of the present invention is to provide a method for measuring an image sticking defect in a liquid crystal display device including the steps of applying a first alternating current voltage to a liquid crystal cell, measuring a first capacitance of the liquid crystal cell, electrically connecting a thin film transistor to the liquid crystal cell, applying a second alternating current voltage to the thin film transistor, the second alternating current voltage is selected from a group comprising alternating current voltages each having different waveforms and alternating current voltages each having different voltage values, combining the second alternating current voltage with a direct current voltage having a same value as a residual direct current voltage occurring in the liquid crystal cell to obtain a combined voltage, applying the combined voltage to the liquid crystal cell, measuring a second capacitance of the liquid crystal cell, calculating a capacitance difference between the first capacitance and the second capacitance, and calculating a quantified value of the image sticking defect by the following equation:

$$y = Avr(\Delta C/C_1) - \alpha(\Delta C/C_1)$$

wherein "y" is the quantified value of the image sticking defect, $C$, is the first capacitance, $\Delta C$ is the capacitance difference between the fist capacitance and the second capacitance, "$Avr(\Delta C/C_1)$" is an average of capacitance differences when the second alternating current voltage is applied to the thin film transistor, and "$\alpha$" is a value of the second alternating current voltage applied to the liquid crystal cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are shown in the accompanying drawings. Wherever possible, the same reference numbers will be used throughout the drawings to refer to the same or like parts.

The present invention uses the capacitance of a liquid crystal cell having alignment layers in order to ascertain the existence of an image-sticking defect and to quantify the image-sticking defect degree. Major components of a capacitor that affect capacitance include the distance between two electrodes of the liquid crystal cell, surface areas of the pair of electrodes, and the dielectric constant of capacitor dielectric substance. Furthermore, alignment layers of the liquid crystal cell also commonly have capacitor characteristics. However, the dielectric constant of the liquid crystal cell capacitor is dependent upon pretilt angles of liquid crystal molecules. Specifically, the capacitance of the liquid crystal cell depends on the applied voltage and pretilt angles. The relationship between the applied voltage and pretilt angles is represented by the equation:

$$\Delta\epsilon = \epsilon// - \epsilon\perp$$

wherein, $\epsilon//$ represents the dielectric constant of liquid crystal molecules when electric field is applied parallel with the longitudinal direction of the liquid crystal molecules, and $\epsilon\perp$ represents the dielectric constant when electric field is applied perpendicular to the longitudinal direction of the liquid crystal molecules.

The thin film transistor liquid crystal display device displays images by way of controlling the alignment direction of the liquid crystal molecules. Accordingly, the image-sticking defect is a phenomenon caused by changing pretilt angles of the liquid crystal molecules when an electrical stress is applied to a liquid crystal cell having alignment layers, thereby changing a capacitance of the liquid crystal cell. A first capacitance $C_1$ of the liquid crystal cell is measured before the electrical stress is applied to the liquid crystal cell. A second capacitance $C_2$ of the liquid crystal cell is then measured after the electrical stress is applied to the liquid crystal cell. Then, a capacitance difference $\Delta C$ between the first capacitance $C_1$, and the second capacitance $C_2$ is calculated. The method can check the existence of an image-sticking defect and quantify the image sticking defect degree using the capacitance difference and electrical stress.

Figure 1:
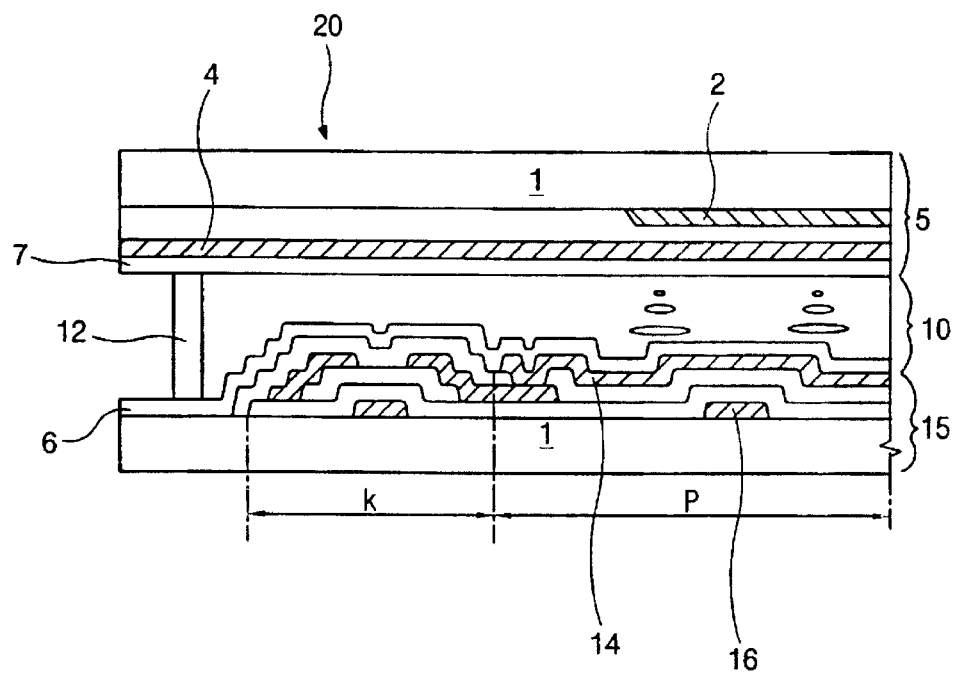
FIG. 1 is a cross-sectional view of a conventional LCD panel in an active matrix LCD.
Figure 2:
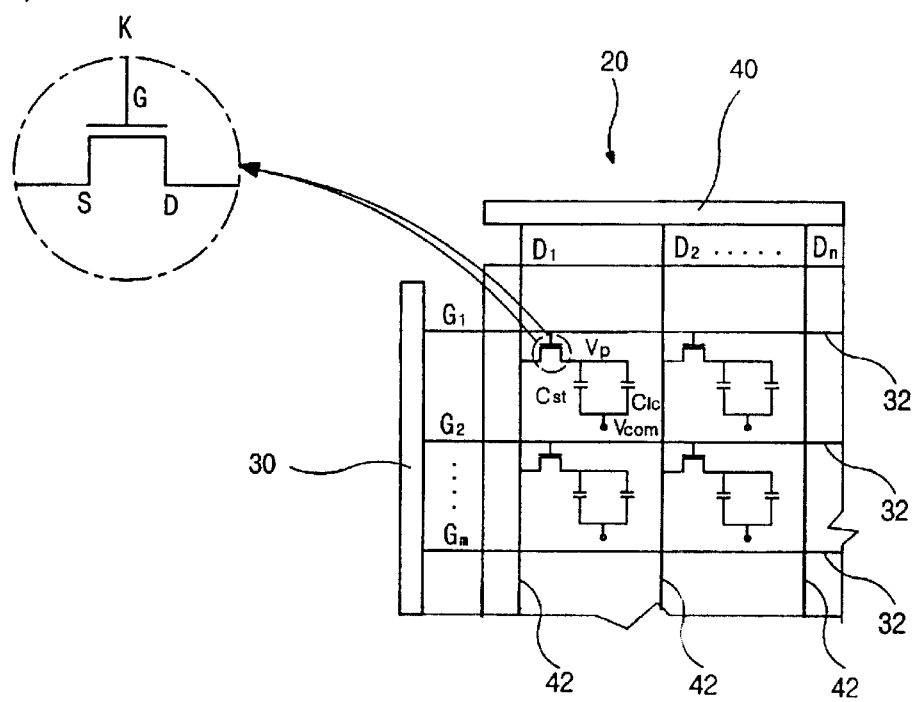
FIG. 2 is a circuit diagram of a conventional active matrix liquid crystal display panel.
Figure 3:
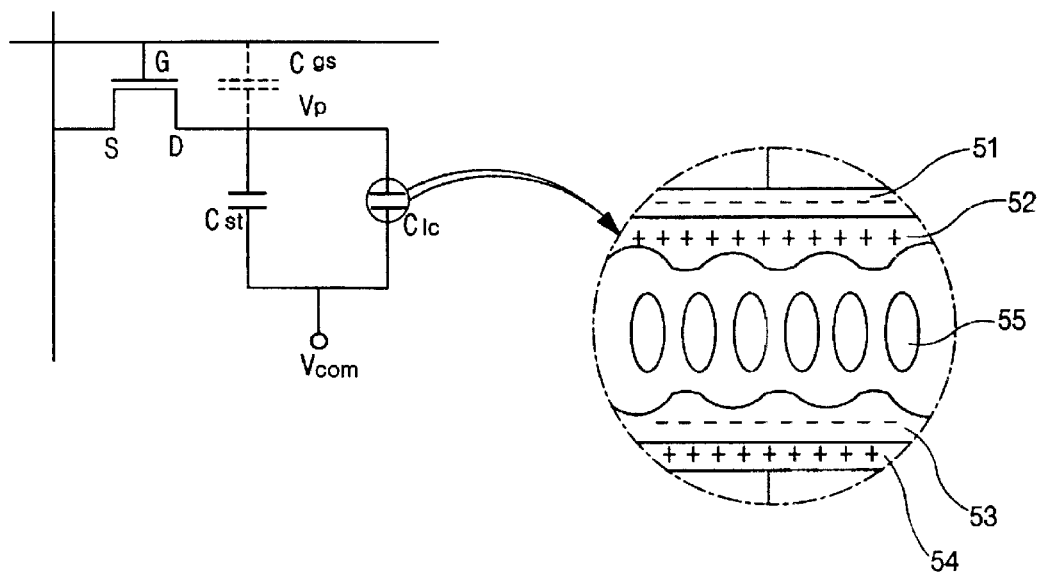
FIG. 3 is a partial circuit diagram of a conventional pixel of liquid crystal display panel.
Figure 4A:
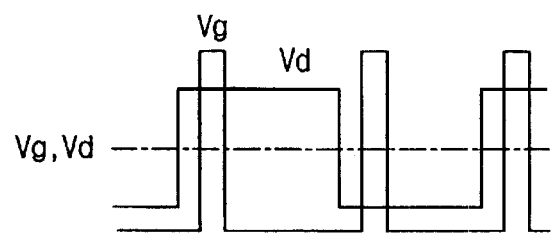
FIG. 4A is a plot showing conventional voltages applied to a thin film transistor of a liquid crystal panel.
Figure 4B:
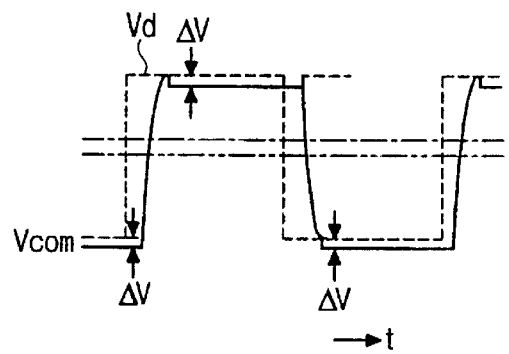
FIG. 4B is a plot showing conventional voltages applied to a liquid crystal cell via a thin film transistor.
Figure 5:
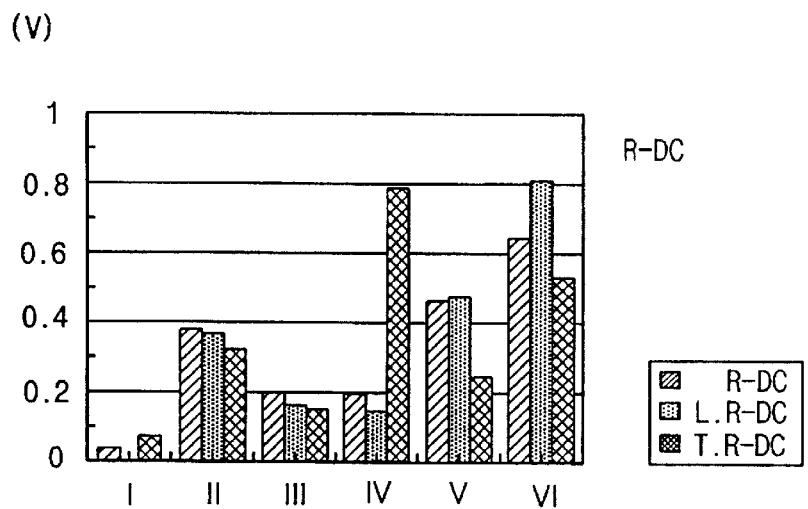
FIG. 5 is a graph showing relative maximum values of a residual direct current voltage (R-DC) according to a conventional R-DC voltage measurement method.
Figure 6:
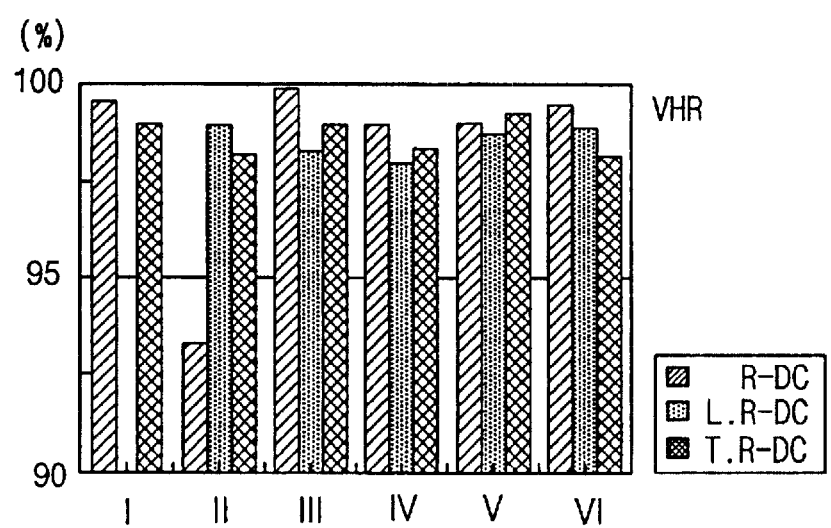
FIG. 6 is a graph showing relative maximum values of a residual direct current voltage (R-DC) according to a conventional VHR measurement method.
Figure 7:
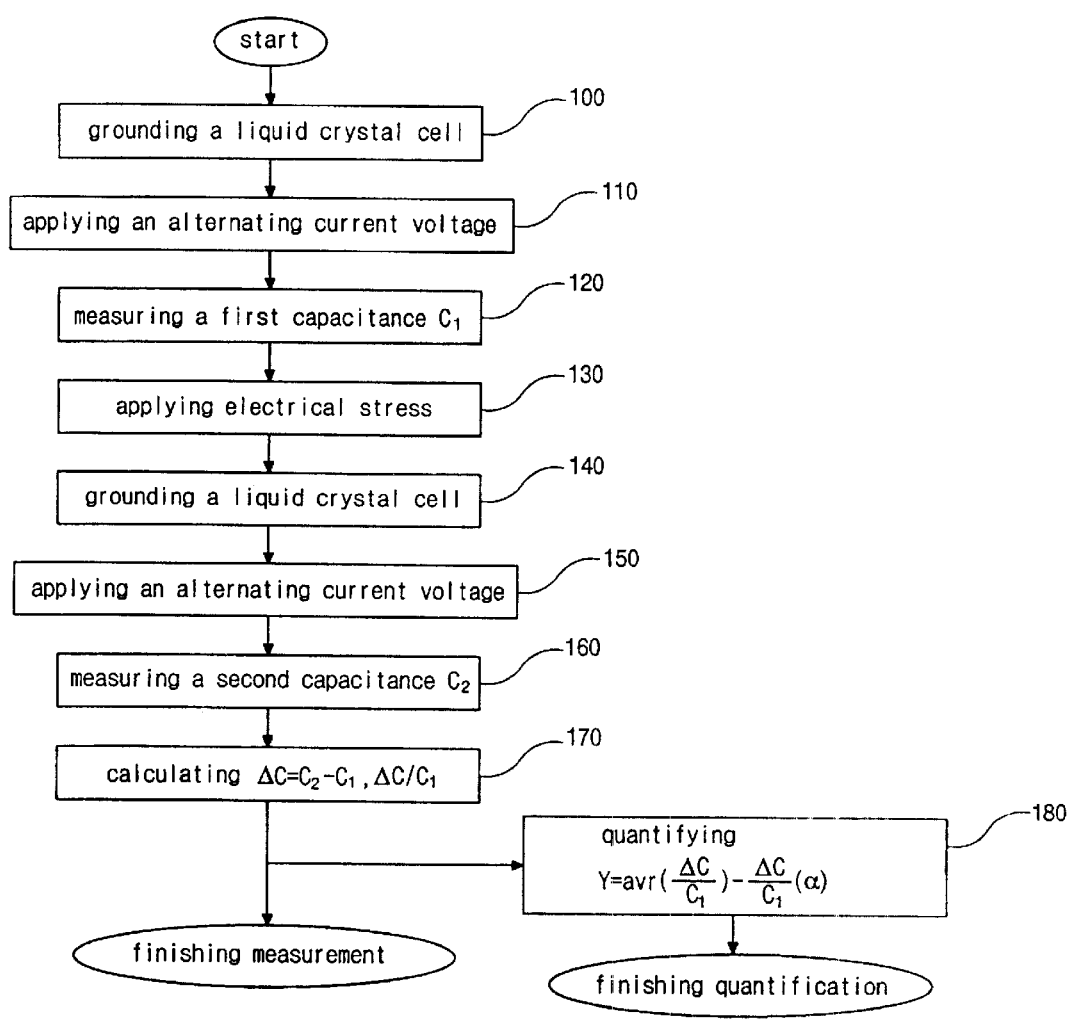
FIG. 7 is a flow chart showing an exemplary method for measuring image-sticking defects according to the present invention.

FIG. 7 is a flow chart showing an exemplary method for measuring image-sticking defect according to the present invention. At first, a liquid crystal cell including an alignment layer is provided for measurement. In step 100, the liquid crystal cell is grounded. Here, the alignment layer does not receive an electrical stress. In step 110, an alternating current voltage is applied to the liquid crystal cell. Then, in step 120, the first capacitance $C_1$ is measured. When applying the alternating current voltage, the alternating current voltage has a same value as the voltage applied to a liquid crystal cell of the conventional TFT-LCD device. In step 130, the electrical stress is applied to the liquid crystal cell. Presently, the electrical stress is at a same level as an electrical stress that the liquid crystal cell receives during practical use of the TFT-LCD. Further, there are two methods of applying the electrical stress to the liquid crystal cell.

In a first method of applying electrical stress, a thin film transistor is electrically connected to the liquid crystal cell after measuring the first capacitance $C_1$ of the liquid crystal cell. Then, the alternating current voltage is applied. At this time, the alternating current voltage has a same frequency as waveforms of the alternating current voltage applied to the thin film transistor when driving the TFT-LCD. Additionally, the alternating current voltage is selected from the waveforms of the alternating current voltage having different relative values of maximum and minimum voltages. From this application of the alternating current voltage, the applied alternating current voltage is combined with an "off-set" direct current voltage occurring in the thin film transistor, and then applied to the liquid crystal cell.

In a second method, an alternating current voltage and a direct current voltage are combined, and then directly applied to the liquid crystal cell having the alignment layer. At this time, the alternating current voltage has a same frequency as waveforms of the alternating current voltage applied to the thin film transistor when driving the TFT-LCD. Additionally, the alternating current voltage is selected from the waveforms of the alternating current voltage having different relative values of maximum and minimum voltage. Furthermore, the direct current voltage combined with the alternating current voltage is the same as a residual direct current voltage occurring in the liquid crystal cell due to the "off-set" direct current voltage in the thin film transistor of the TFT-LCD.

According to the above-described methods for applying the electrical stress, there are no differences in the results and in performing later process steps. However, according to the first method described above, it is possible to measure the image sticking defect although the residual direct current voltage occurring in the liquid crystal cell is not known. Furthermore, the image sticking defect caused by all components in the TFT-LCD can be measured. On the contrary, according to the second method described above, the residual direct current voltage can be compared to the existence of the image-sticking defect or the image-sticking defect degree.

As described above, although the electrical stress is varied and applied by different methods, the electrical stress should be continuously applied to the liquid crystal cell for more than 30 minutes. Thereafter, the electrical stress applied to the liquid crystal cell changes the pretilt angle of liquid crystal molecules.

In step 140 of FIG. 7, the liquid crystal cell is grounded to discharge any electrical charge from the liquid crystal cell. Thereafter, an alternating current voltage is applied to the liquid crystal cell, in step 150. In step 160, a second capacitance $C_2$ of the liquid crystal cell that includes the alignment layer is measured.

Since the pretilt angle of the liquid crystal molecules changes by application of the electrical stress, the second capacitance $C_2$ may be different from the first capacitance $C_1$. Therefore, there may be a capacitance difference $\Delta C$ calculated by the equation:

$$\Delta C = C_2 - C_1$$

Here, the absolute value $|\Delta C|$ of the capacitance difference $\Delta C$ is proportional to the image sticking defect. If the absolute value $|\Delta C|$ is zero (0), then the image-sticking defect phenomenon does not occur in the TFT-LCD. However, if the absolute value $|\Delta C|$ of the capacitance difference is more than zero (0), then the image-sticking defect phenomenon exists in the TFT-LCD.

Figure 8:
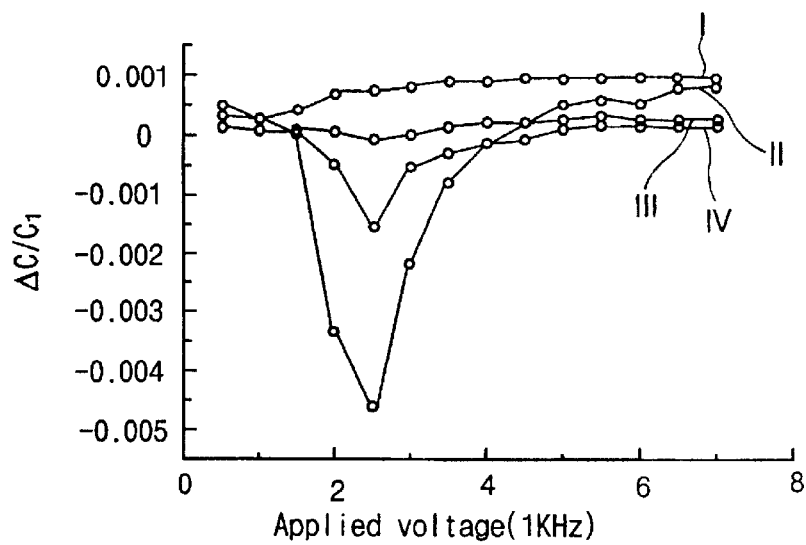
FIG. 8 is an exemplary graph illustrating an image-sticking defect existence and degree depending on an applied voltage according to the present invention.

FIG. 8 is a graph illustrating the existence of an image-sticking defect and the corresponding degree that depends on the applied voltage according to the present invention. In FIG. 8. the roman numerals I to IV represent the liquid crystal cells having different alignment layers, wherein the electrical stress is applied to the liquid crystal cell using the first method described above. For example, roman numeral I represents data of a liquid crystal cell having a polyimide alignment layer. A 1 KHz alternating voltage is applied to each liquid crystal cell and increases by 0.5V intervals. Whenever the electrical stress is applied, the capacitance difference $\Delta C$ is calculated. Accordingly, the ratio of the capacitance difference $\Delta C$ to the first capacitance $C_1$ (i.e., $\Delta C/C_1$) is plotted with the applied voltage as shown in FIG. 8.

In FIG. 8, since the capacitance difference $\Delta C$ is not calculated as an absolute value, the gradient of the graph indicates a capacitance variation. Therefore, the image-sticking defect phenomenon can be recognized by the existence of this gradient. In the image-sticking defect measurement method according to the present invention, a relative minimum value of the applied voltage to induce the electrical stress is zero (0V). Alternatively, a relative maximum value of the applied voltage is 7V that is similar to or the same as the alternating current voltage applied to the liquid crystal cell of the TFT during operation.

In the second method of applying electrical stress to a liquid crystal cell, results are similar to the first method. Accordingly, data from the second method are similar to the data shown in FIG. 8. Furthermore, in the second method the direct current voltages are combined with the alternating current voltage applied to the liquid crystal cells I to IV and are 0.012V, 0.929V, 0.296V and 0.700V, respectively. Accordingly, the residual direct current voltage is comparable to the gradient of FIG. 8, and the image sticking defect and the absolute value $|\Delta C|$ are greater if the residual direct current voltage is greater.

Figure 9:
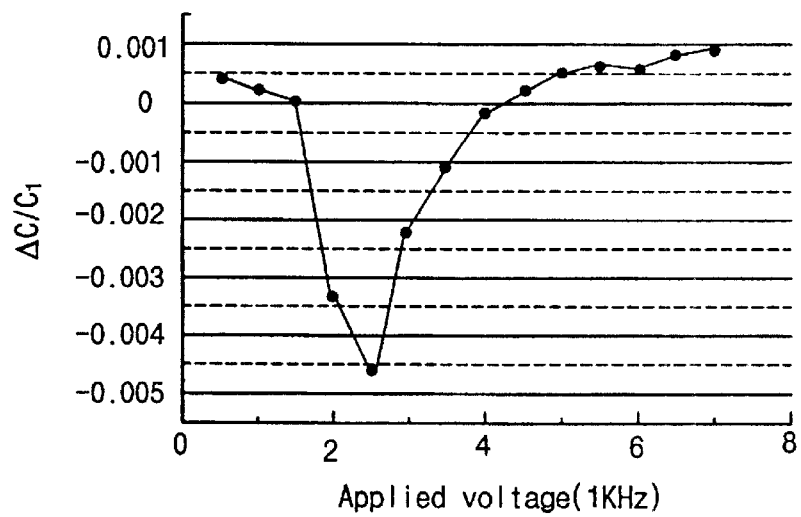
FIG. 9 is an exemplary graph of an image-sticking defect according to the present invention.

FIG. 9 is a graph to illustrate the quantification of the image sticking defect according to the present invention. In FIG. 9, the electrical stress is applied to the liquid crystal cell using the methods described above. A 1 KHz alternating voltage is applied to the liquid crystal cell and increases by 0.5V intervals. Whenever the electrical stress is applied, the capacitance difference $\Delta C$ is calculated. Accordingly, the ratio of the capacitance difference $\Delta C$ to the first capacitance $C_1$ (i.e., $\Delta C/C_1$) is plotted with the applied voltage in FIG. 9. The quantification value of the image sticking defect is evaluated by the following equation:

$$y = Avr(\Delta C/C_1) - \alpha(\Delta C/C_1)$$

wherein "y" is the quantification value of the image sticking defect, "$Avr(\Delta C/C_1)$" is the average of capacitance differences when the alternating current voltage is applied as the electrical stress, and "$\alpha$" is the value of the alternating current voltage applied to the liquid crystal cell as the electrical stress.

The following table 1 shows the results of the quantification value of FIG. 9.

TABLE 1

| Applied Voltage | 0.5 | 1 | 1.5 | 2 | 2.5 | 3 | 3.5 |
|---|---|---|---|---|---|---|---|
| Quantified Value "y" | −0.008 | −0.008 | −0.006 | 0.058 | 0.97 | 0.062 | 0.03 |
| Applied Voltage | 4 | 4.5 | 5 | 5.5 | 6 | 6.5 | 7 |
| Quantified Value "y" | 0.074 | −0.017 | −0.03 | −0.04 | −0.043 | −0.058 | −0.067 |

The quantified values "y" can be evaluated when the various kinds of alternating current voltages having the same frequency are applied as the electrical stress to the liquid crystal cell. Specifically, the various kinds of voltages are applied to one liquid crystal cell having a particular alignment layer. Thus, the image-sticking defect degree can be easily recognized and quantified depending on the applied alternating current voltages.

Figure 10:
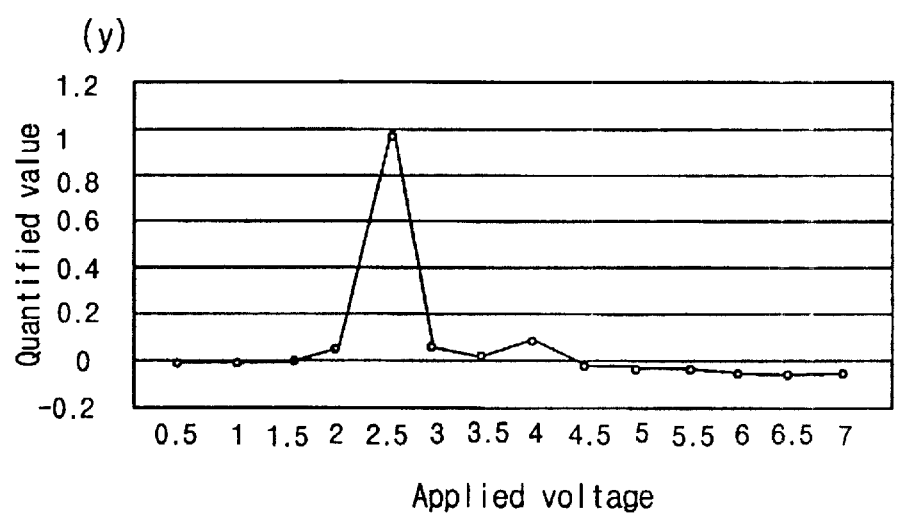
FIG. 10 is an exemplary graph illustrating the quantified values of an image sticking defect depending on voltages applied to a liquid crystal cell having an alignment layer according to the present invention.

FIG. 10 is a graph illustrating the quantified values of the image-sticking defect depending on the voltages applied to the liquid crystal cell having the alignment layer according to the present invention. FIG. 10 graphically illustrates data of Table 1. In FIG. 10, since the quantified values "y" are not plotted as absolute values, the gradient of the graph indicates the degree of the image sticking defect. Therefore, the image sticking defect increases as the gradient of the graph of FIG. 10 increases.

As described before, the first capacitance is measured before application of the electrical stress, and the second capacitance is measured after the electrical stress is applied. Then, the capacitance difference between the first and second capacitances is calculated to confirm the existence of the image-sticking defect and to quantify the image-sticking defect degree. Although the liquid crystal cells of the TFT-LCD have various alignment layers or various electrical stresses that are applied to the liquid crystal cell having a particular alignment layer, confirming the existence of the image-sticking defect and a corresponding degree can be easily done. Furthermore, the image-sticking defect phenomenon that is not observed by the ordinary eye can be measured. Hence, the image quality of the TFT-LCD can be improved.

It will be apparent to those skilled in the art that various modifications and variations can be made in the method for measuring the image-sticking of the present invention without departing from the spirit or scope of the invention. Thus, it is intended that the present invention cover the modifications and variations of this invention provided they come within the scope of the appended claims and their equivalents.

What is claimed is:

1. A method for measuring an image sticking defect in a liquid crystal display device, comprising:
   grounding a liquid crystal cell, the liquid crystal cell including an alignment layer;
   applying a first alternating current voltage to the liquid crystal cell;
   measuring a first capacitance of the liquid crystal cell;
   applying an electrical stress to the liquid crystal cell;
   measuring a second capacitance of the liquid crystal cell; and
   calculating a capacitance difference between the first capacitance and the second capacitance.

2. The method according to claim 1, wherein the first alternating current voltage is about 0V to about 7V.

3. The method according to claim 2, wherein a frequency of the first alternating current voltage is about 1 KHz.

4. The method according to claim 1, wherein the step of applying an electrical stress to the liquid crystal cell includes:
   electrically connecting a thin film transistor to the liquid crystal cell;
   applying a second alternating current voltage to the thin film transistor, the second alternating current voltage is selected from a group including alternating current voltages each having different waveforms and alternating current voltages each having different voltage values;
   combining the second alternating current voltage with an off-set voltage occurring in the thin film transistor to obtain a combined voltage; and
   applying the combined voltage to the liquid crystal cell.

5. The method according to claim 4, wherein the second alternating current voltage has a minimum value of about 0V and a maximum value of about 7V.

6. The method according to claim 1, wherein the step of applying an electric stress to the liquid crystal cell includes:
   electrically connecting a thin film transistor to the liquid crystal cell;
   applying a second alternating current voltage to the thin film transistor, the second alternating current voltage is selected from a group comprising alternating current voltages each having different waveforms and alternating current voltages each having different voltage values;
   combining the second alternating current voltage with a direct current voltage having a same value as a residual direct current voltage occurring in the liquid crystal cell to obtain a combined voltage; and
   applying the combined voltage to the liquid crystal cell.

7. The method according to claim 6, wherein the alternating current voltages have a minimum value of about 0V and a maximum value of about 7V.

8. The method according to claim 1, wherein a quantified value of the image sticking defect is calculated by the following equation:

$$y = Avr(\Delta C/C_1) - \alpha(\Delta C/C_1)$$

wherein "y" is the quantified value of the image sticking defect, $C_1$ is the first capacitance, $\Delta C$ is the capacitance difference between the fist capacitance and the second capacitance, "$Avr(\Delta C/C_1)$" is an average of capacitance differences when the alternating current voltage is applied as the electrical stress, and "$\alpha$" is a value of the second alternating current voltage applied to the liquid crystal cell as the electrical stress.

9. The method according to claim 1, further comprising the step of grounding the liquid crystal cell after the step of applying an electrical stress.

10. A method for measuring an image sticking defect in a liquid crystal display device, comprising:
    applying a first alternating current voltage to a liquid crystal cell;
    measuring a first capacitance of the liquid crystal cell;
    electrically connecting a thin film transistor to the liquid crystal cell;
    applying a second alternating current voltage to the thin film transistor, the second alternating current voltage is selected from a group comprising alternating current voltages each having different waveforms and alternating current voltages each having different voltage values;
    combining the second alternating current voltage with an off-set voltage occurring in the thin film transistor to obtain a combined voltage;
    applying the combined voltage to the liquid crystal cell;
    measuring a second capacitance of the liquid crystal cell;
    calculating a capacitance difference between the first capacitance and the second capacitance; and
    calculating a quantified value of the image sticking defect by the following equation:

$$y = Avr(\Delta C/C_1) - \alpha(\Delta C/C_1)$$

wherein "y" is the quantified value of the image sticking defect, $C_1$ is the first capacitance, $\Delta C$ is the capacitance difference between the fist capacitance and the second capacitance, "$Avr(\Delta C/C_1)$" is an average of capacitance differences when the second alternating current voltage is applied as the thin film transistor, and "$\alpha$" is a value of the second alternating current voltage applied to the liquid crystal cell.

11. The method according to claim 10, further comprising the step of grounding the liquid crystal cell after the step of applying the combined voltage to the liquid crystal cell.

12. The method according to claim 10, wherein the liquid crystal cell includes an alignment layer.

13. The method according to claim 10, wherein the first alternating current voltage is about 0V to about 7V.

14. The method according to claim 13, wherein a frequency of the first alternating current voltage is about 1 KHz.

15. The method according to claim 10, wherein the second alternating current voltage is about 0V to about 7V.

16. The method according to claim 15, wherein a frequency of the second alternating current voltage is about 1 KHz.

17. A method for measuring an image sticking defect in a liquid crystal display device, comprising:

applying a first alternating current voltage to a liquid crystal cell;

measuring a first capacitance of the liquid crystal cell;

electrically connecting a thin film transistor to the liquid crystal cell;

applying a second alternating current voltage to the thin film transistor, the second alternating current voltage is selected from a group comprising alternating current voltages each having different waveforms and alternating current voltages each having different voltage values;

combining the second alternating current voltage with a direct current voltage having a same value as a residual direct current occurring in the liquid crystal cell to obtain a combined voltage;

applying the combined voltage to the liquid crystal cell;

measuring a second capacitance of the liquid crystal cell;

calculating a capacitance difference between the first capacitance and the second capacitance; and calculating a quantified value of the image sticking defect by the following equation:

$$y = Avr(\Delta C/C_1) - \alpha(\Delta C/C_1)$$

wherein "y" is the quantified value of the image sticking defect, $C_1$ is the first capacitance, $\Delta C$ is the capacitance difference between the first capacitance and the second capacitance, "$Avr(\Delta C/C_1)$" is an average of capacitance differences when the second alternating current voltage is applied to the thin film transistor, and "$\alpha$" is a value of the second alternating current voltage applied to the liquid crystal cell.

18. The method according to claim 17, further comprising the step of grounding the liquid crystal cell after the step of applying the combined voltage to the liquid crystal cell.

19. The method according to claim 17, wherein the liquid crystal cell includes an alignment layer.

20. The method according to claim 17, wherein the first alternating current voltage is about 0V to about 7V.

21. The method according to claim 20, wherein a frequency of the first alternating current voltage is about 1 KHz.

22. The method according to claim 17, wherein the second alternating current voltage is about 0V to about 7V.

23. The method according to claim 22, wherein a frequency of the second alternating current voltage is about 1 KHz.

* * * * *

UNITED STATES PATENT AND TRADEMARK OFFICE
CERTIFICATE OF CORRECTION

PATENT NO. : 6,590,411 B2
DATED : July 8, 2003
INVENTOR(S) : Man-Hoan Lee

It is certified that error appears in the above-identified patent and that said Letters Patent is hereby corrected as shown below:

<u>Title page,</u>
Item [65], Prior Publication Data, delete "10-2000-6002314" and insert
-- 10-2000-0062314 --.

Signed and Sealed this

Twentieth Day of January, 2004

JON W. DUDAS
*Acting Director of the United States Patent and Trademark Office*